United States Patent [19]

Ness et al.

[11] Patent Number: 4,593,800

[45] Date of Patent: Jun. 10, 1986

[54] TORQUE RELEASE DRIVE CONNECTOR

[75] Inventors: Joseph M. Ness, Wayzata; Lyle J. Gerads, Minnetonka, both of Minn.

[73] Assignee: Helland Research & Engineering, Inc., Minneapolis, Minn.

[21] Appl. No.: 468,851

[22] Filed: Feb. 22, 1983

[51] Int. Cl.[4] .................. F16D 7/00; F16D 43/20
[52] U.S. Cl. .................. 192/56 R; 192/30 W; 192/150
[58] Field of Search .............. 192/56 R, 150, 30 W; 464/38, 36, 23

[56] References Cited

U.S. PATENT DOCUMENTS

| 865,486 | 9/1907 | Gannon | 464/36 |
|---|---|---|---|
| 2,045,572 | 6/1936 | Dow | 464/38 X |
| 2,501,648 | 3/1950 | Ogden | 464/38 |
| 2,600,674 | 6/1952 | Natkins | 464/36 |
| 3,080,029 | 3/1963 | Stober | 192/56 R |
| 3,252,303 | 5/1966 | Weasler et al. | 464/36 |
| 3,675,749 | 7/1972 | Olson | 192/56 |
| 3,893,553 | 7/1975 | Hansen | 192/56 R |
| 4,142,616 | 3/1979 | Dekoninck | 192/56 |
| 4,226,316 | 10/1980 | Geisthoff | 192/56 |
| 4,255,946 | 3/1981 | Hansen | 64/29 |
| 4,263,996 | 4/1981 | Putney | 192/56 |
| 4,286,441 | 9/1981 | Maggio et al. | 64/30 |

FOREIGN PATENT DOCUMENTS 171894 6/1960 Sweden .................. 192/56 R

*Primary Examiner*—Rodney H. Bonck
*Attorney, Agent, or Firm*—Schroeder & Siegfried

[57] ABSTRACT

The disclosure is directed to a clutch or connector mechanism that is capable of having the individual bias changed so that it is independent of the torque applied to the clutch. The driving and driven elements may be interchanged and either the driving or driven elements may have indentations formed at different radii to control the torque at one setting in a first rotational direction and reach a different torque at another setting in an opposite rotational direction. The two rotatable members, one driving and the other being driven, form two bearings that provide loading support within the clutch or connector.

1 Claim, 6 Drawing Figures

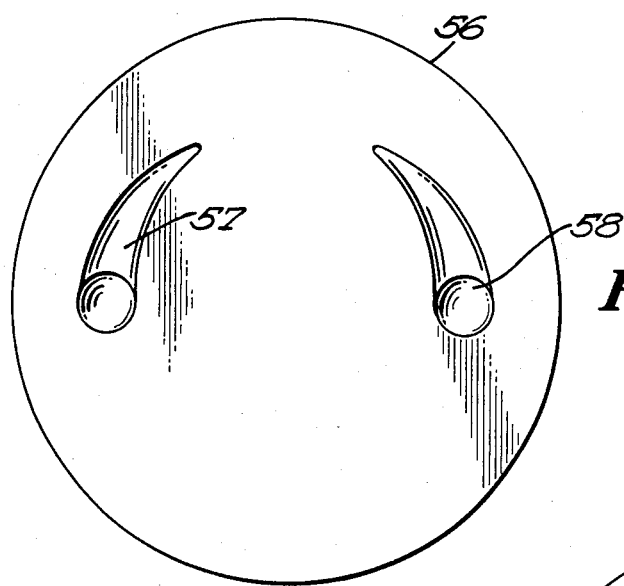
Fig 5
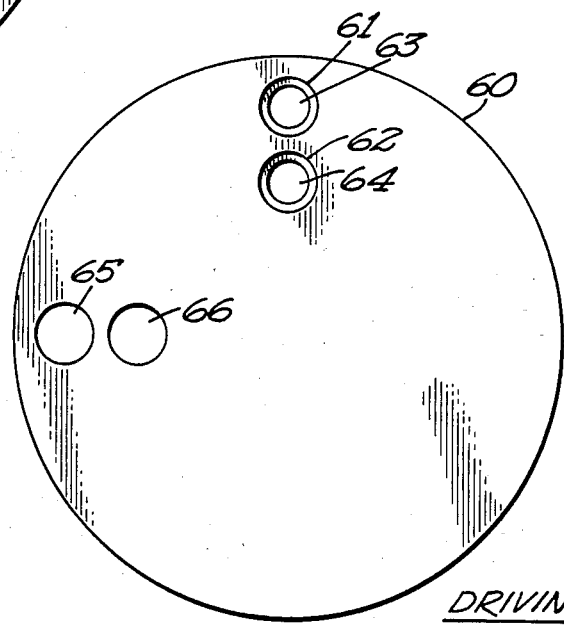
DRIVING
Fig 6
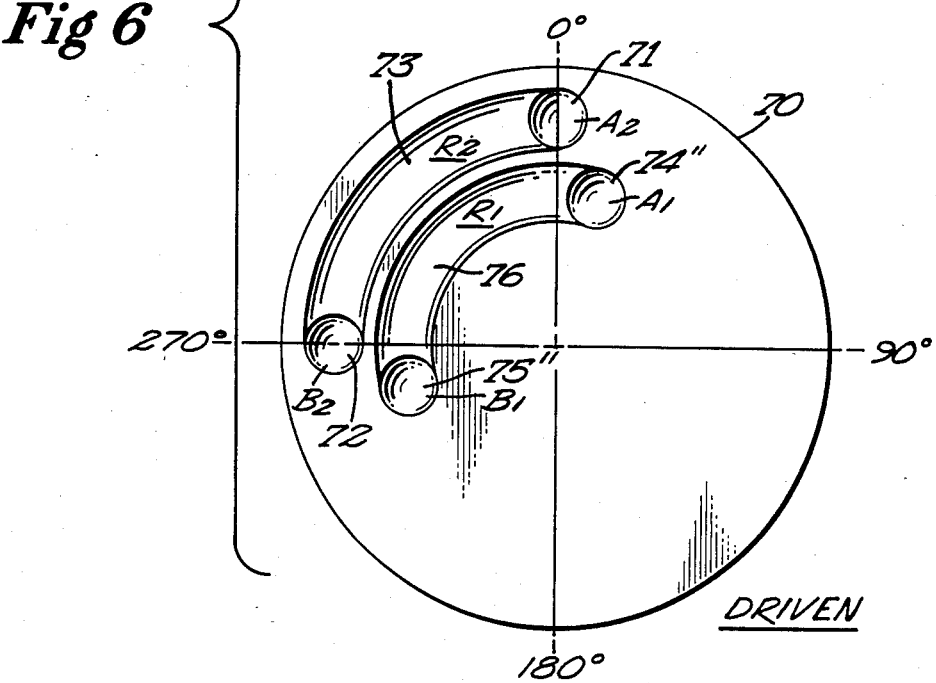
DRIVEN

TORQUE RELEASE DRIVE CONNECTOR

BACKGROUND OF THE INVENTION

This invention relates to a torque clutch or connector and more particularly to one that may be actuated whenever the torque applied to the driving elements overcomes the individual bias of the movable elements.

Certain prior art devices are generally known wherein they are used to provide accurate overload protection in a mechanical power transmission system. These particular clutches generally act as a torque limiter and disengage the motor drives from the driven portions of the machinery to protect the entire system. One such device is that of U.S. Pat. No. 3,124,227 issued Mar. 10, 1964 and assigned to assignee, entitled "Automatically Resetting Torque Clutch". It will be noted that the device is resettable after having been actuated. Such clutches use a spring-loaded movable pawl and detent encased to provide a proper torque for the machinery. While this particular structure may be made to handle different torque ratings, it is achieved through the change of one of the springs in the mechanism.

Another U.S. Pat. No. 4,142,616 granted Mar. 6, 1979 entitled "Torque Limiting Devices" makes use of a plurality of balls engagable in respective pairs of seats formed in adjacent faces of the clutch so as to automatically hold the device in disengagement when a torque over-load causes the balls to move out of the seats and thus forces the faces away from one another against the action of the spring. However, there is no provision in this mechanism to adjust each of the biased elements individually or provide any differences or deviation in torque that may be applied depending upon the driving direction.

U.S. Pat. No. 4,255,946 entitled "Torque Over-Load Sensing Device" granted Mar. 17, 1981 has a ball-receiving portion that is equal in number to the ball-driving portion and the structure is made so that the device utilizes the same spring means for resiliently loading a switch plate and for setting the maximum driving torque. Thus, this particular mechanism makes no provision for individual loading of the different balls, nor does it make any provision to have the mechanism torque sensitive, depending upon the direction that the device is being rotated.

SUMMARY OF THE INVENTION

The present invention may be used as either a clutch or a coupling to either drive a work-engaging force or may couple a driving force to a work-engaging element through the use of the mechanism. Additionally, the driving mechanism makes use of spring-loaded followers that engage certain hemispherical indentations on a driven plate, both of which are contained within each other and form a portion of the clutch or coupling. By adjusting each follower individually, the torque required to trip the clutch in one direction may be different from that which is used to trip the clutch when turned in the opposite direction and variations of this may be attained by changing the radius of the different bores that are used to contain the plungers. Through the use of a pair of bearings formed from both the driven and driving elements, the mechanism may be loaded and little chatter, or vibration is sensed in the overall system.

It is, therefore, a general object of this invention to provide a releasable clutch or connector that permits individual adjustment of each biased elements.

It is still another object of this invention to provide a releasable clutch or connector that is actuated whenever the torque applied to said driving element overcomes the individual bias of the movable elements.

It is still a further object of this invention to provide a trigger mechanism that is actuated whenever the torque applied to said driving element overcomes the individual bias of the movable elements.

It is yet a further object of this invention to provide a releasable clutch or connector in which a pair of bearings are formed between the driving and driven elements to increase the loading on the mechanism.

It is still another object of this invention to provide a releasable clutch or connector that may be driven in different directions and be actuated at different torque levels.

BRIEF DESCRIPTION OF THE DRAWINGS

A detailed description of one preferred embodiment of the torque release drive connector is hereafter described with specific reference being made to the drawings in which:

FIG. 5 is an end elevation view of the driven element of an alternate mechanism of the clutch or connector; and FIG. 6 is an end elevation view of alternate driven and driving elements of the clutch or connector.

DESCRIPTION OF A PREFERRED EMBODIMENT

Figure 1:
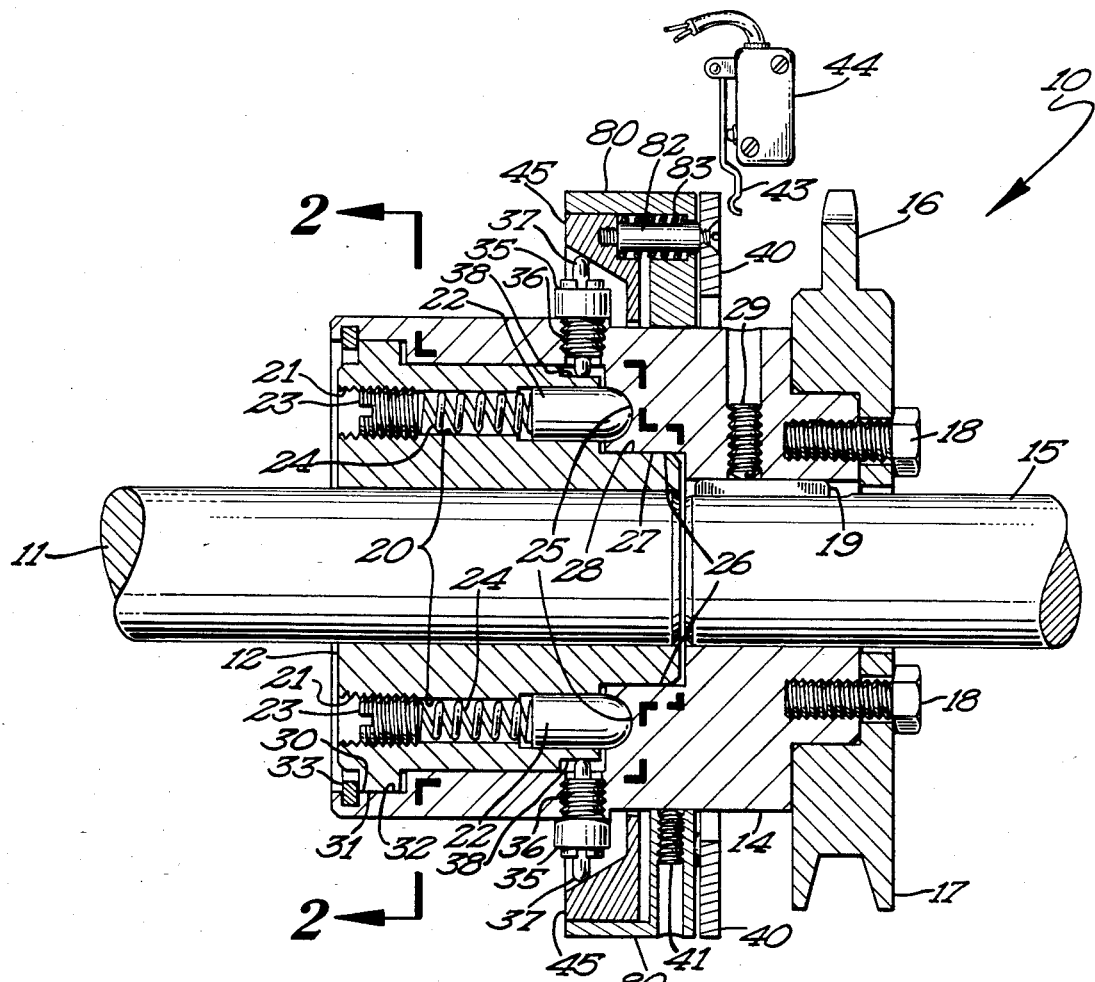
FIG. 1 is a sectional view of the clutch or connector disclosing several output drives.
Figure 2:
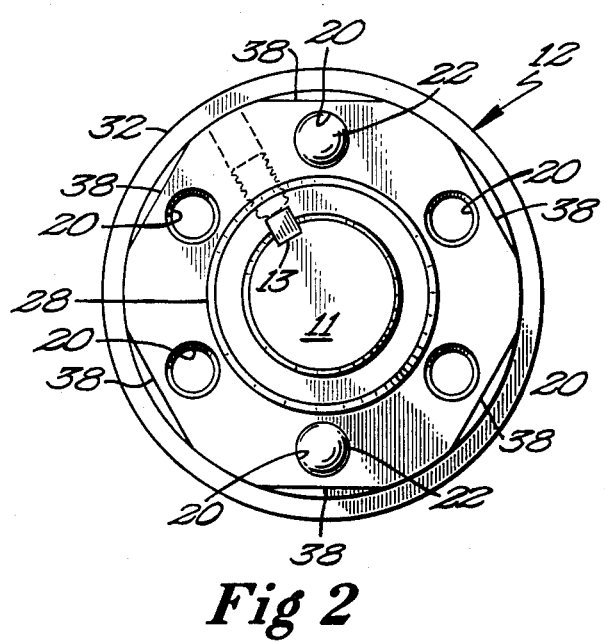
FIG. 2 is an end elevation view of the driving element of the clutch or connector.

Turning to FIG. 1, a clutch or connector 10 is disclosed in section in which a drive shaft 11 is connected to a driving element 12 through suitable means such as a key 13. Of course, set screws may be used in place of key 13, if desired.

The outer housing or driven element 14 is shown where a shaft 15 is connected to the inner bore as well as a chain sprocket member 16 and a pulley 17. The pulley 17 and sprocket 16 are secured to the driven member 14 by suitable means such as cap screws 18. A key 19 is used to secure shaft 15 to driven member 14 and is held in place with set screws 29.

It will be observed that there are a plurality of bores 20 formed axially in driving member 12 and they are disposed at a given radius. Screw threads 21 are cut or formed at the end of each of the tubular bores 20 and wherever a movable element 22 is to be used in the bore, a set screw or adjustable plug 23 is adjusted through a compressible spring 24 to provide a proper bias or spring tension against the ends of movable elements 22. It has been found that the two parts thus described, driving element 12 and the driven element 14, may be formed from a form of nylon and is marketed under the name of Nylatron ® that is manufactured and sold by the Polymer Corporation, P.O. Box 422, Reading, Pa. 19603. This form of nylon contains solid lubricant additives which impart self-lubrication and superior wearresistance characteristics. In many applications, the material may be operated without either start-up or running lubrication.

A plurality of hemispherical indentations 25 are formed on the inner face 29 of driven element 14 and for purposes of illustration will be restricted to four positions of equal radius and set at 90° intervals from each other. It will be recognized that in some instances, only opposed pairs or a single pair of indentations may be used and in some instances, only a single indentation 25 may be used with a movable element 22.

A pair of bearings are formed within the two elements 12 and 14 that for some purposes may be reversed. That is, element 12 may be a driven element and element 14 may be the driving element. A first bearing 26 is formed in driven member 14 by providing an annular shoulder 27 against which an annular protrusion 28 of driving element 12 may bear.

Another bearing 30 is formed near the edge of driven element 14 by having an annular groove 31, into which an annular ring 32 of driving element 12, may be fitted. That is, annular ring 32 may bear against the outer confines of its mating portion 31 to form a second bearing between the two moving parts. A retaining ring 33 is disposed in an annular groove 34 to contain driving element 12 and keep it from withdrawing from the clutch or connector 10.

In some applications, it may be desirable to know when the driving element and driven elements 12 and 14 respectively are rotated so that the bullet-shaped movable elements 22 are driven into the axial bores and the mechanism is permitted to attain an actuated condition. In keeping with this approach, a pair of collars 35 are threadably secured within a pair of bores 36. That is, collars 35 are disposed along a radius passing through a hemispherical indentation 25. Contained within each collar 35, is a driving pin 37 that is spring loaded toward the inward position of the clutch or connector mechanism. Pins 37 are each in direct alignment and contact with, a tangential or normally oriented slot 38 that is cut across the outside edge of driving member 12 about a radius passing through each of bores 20. Thus, as driving element 12 rotates with respect to driven element 14, pins 37 are forced outwardly.

To complete the remaining portion of the control or alarm system, a ring 40 moves with axial movement along the outside of driven element 14 through the use of a number of pins and set screws 41 pinning an inner annular ring 80 to member 14. As shown, ring 40 is in position to be moved to the right until it engages a switch arm 43 of a precision snap-action switch 44. In the unenergized position, pin 37 moves inwardly against surface 38 and a beveled circular shoe 45 remains in a "collapsed" condition. A further explanation of this mechanism is disclosed in FIG. 3.

Figure 4:
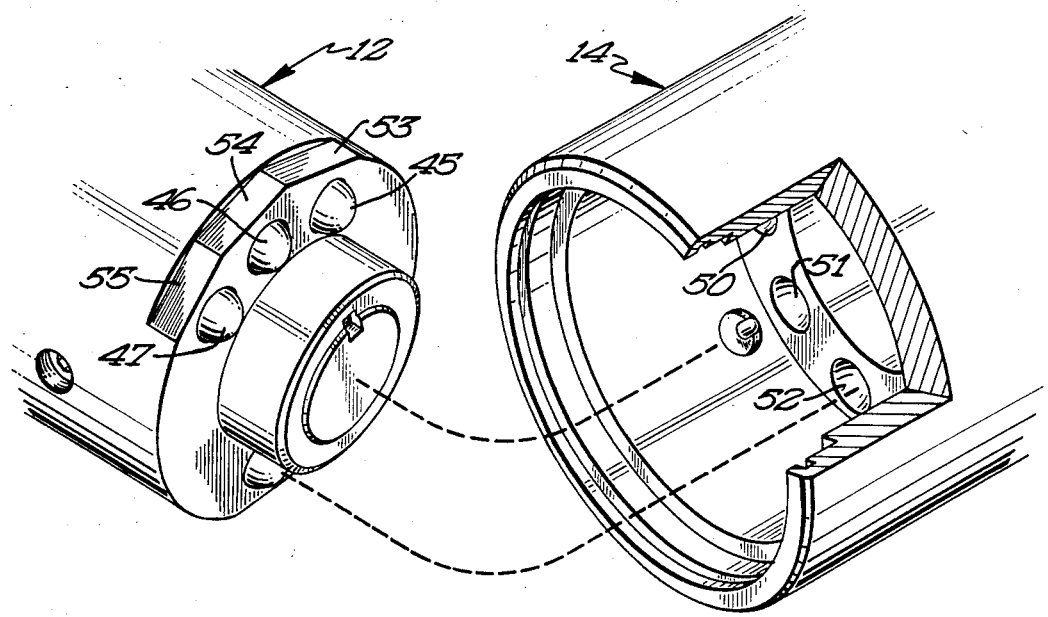
FIG. 4 is a partial perspective view with a portion of another version of the clutch or connector removed.

Turning now to FIG. 4, there will be seen an outer housing or driven member 14 and a driving member 12. Disposed within the driving member 12 are three bores and movable members 45, 46 and 47 that work in concert with hemispherical indentations 50, 51 and 52. Keeping in mind that the bias may be changed on each of the springs behind movable elements 45 through 47 or that they may remain the same, it will be seen that the torque required to trip the clutch will increase as each movable member engages a new indentation and that the maximum will occur when movable member 45 engages indentation 52. It may also be desirable to increase the length of each radius of the flat segments 53, 54 and 55 that are formed around the edge of driving member 12.

Turning now to FIG. 5, there is disclosed a driven member 56 that has a pair of tear shaped indentations 57 and 58 formed therein. The spring bias is adjusted so that when driven member 56 rotates clockwise, a movable element moves against the lower edge portion of indentation 58 and causes it to be driven clockwise. In a like manner, tear shaped indentation 57 has the movable element pressed against the lower portion of the indentation and causes the driven member 56 to be rotated counterclockwise. Thus by setting the two settable screw heads 23 to the appropriate spring setting, a greater torque may be created for either a clockwise or counterclockwise motion of driven member 56.

A different variation of the preceding means of loading the movable elements is disclosed in FIG. 6 wherein a driving element 60 discloses a first bore 61 at radius $R_2$ and a second bore 62 at radius $R_1$ into which are supplied a pair of movable members or followers 63 and 64 respectively. Disposed 90° counterclockwise therefrom are another pair of bores 65 at radius $R_2$ and 66 at radius $R_1$. That is, followers 63 and 64 are seen from the end of the axial bore that the screw plug fits into.

A driven member 70 is also turned in a clockwise direction and contains a first hemispherical indentation 71 that originates along a 0° line or axis and at radius $R_2$. At the same radius, and at the 270° position, another indentation 72 is formed and a semicircular groove 73 joins the two hemispherical indentations at a radius $R_2$.

In a similar manner, another hemispherical indentation 74 is formed in driven member 70 at radius $R_1$ and is connected to another hemispherical indentation 75 through a suitable semicircular cross section channel 76. Through this arrangement, the torque is controlled by applying the same or a greater bias to movable element 63 than that applied to element 64 and thus the outer radius is in control.

When the torque on driving member 60 exceeds the torque set at follower 63, the follower 63 will compress a portion of the follower 63 (approximately one-half the follower radius) and that will then actuate the overload warning pin such as pin 37. Upon the foregoing happening, follower 64 moves into full engagement or position to drive driven element 70 and this condition will prevail until the torque on drive element 60 is reduced to allow follower 63 to again relocate in its full drive position, or torque on drive element 60 is increased to cause the disengagement of both followers 63 and 64, thus permitting the actuating pin 37 to signal or indicate a total overload condition in which the driven mechanism is stopped from operating.

Figure 3:
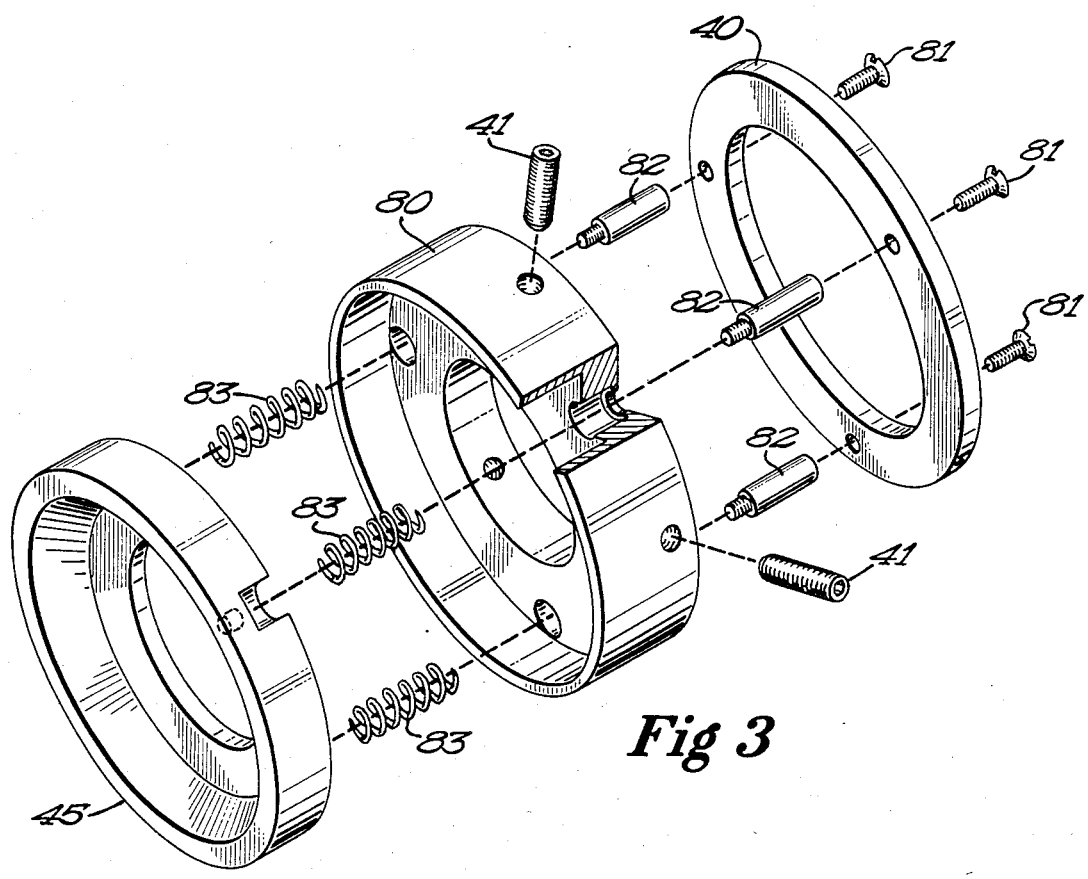
FIG. 3 is a partial perspective view of an actuating disc used with the clutch or connector.

As stated earlier, FIG. 3 shows in more detail, the alarm mechanism disposed about driven member 14 of FIG. 1. In particular, there is a case 80 that encompasses a wedge ring member 45 and ring member 45 is held in place against ring 40 through a plurality of screws 81 that work with a plurality of space pins 82 and another plurality of compression springs 83. It will be noted that various arrangements may be used in place of the ring to work with each of the pins 37.

In considering this invention, it should be remembered that the present disclosure is illustrative only and the scope of the invention should be determined by the appended claims.

What we claim is:

1. A releasable torque clutch comprising:

(a) a rotatable driving element adapted for connection to a driving force;

(b) a first plurality of axial bores formed in said driving element;

(c) a rotatably driven element adapted for connection to a work transmitting element and having an inner face, said driven and driving elements being axially disposed, one within the other, and contained to prevent axial movement between the same;

(d) a first plurality of hemispherical indentations disposed equidistance from each other at the same radius in the inner face of said driven element;

(e) a second plurality of axial bores larger in diameter than, but aligned with said first plurality to form a shoulder where they intersect in said driving element and confronting said hemispherical indentations certain of said plurality of bores disposed circumferentially from mating with said plurality of indentations;

(f) a plurality of movable bullet shaped elements disposed within some of said second plurality of axial bores, each individually biased to engage certain of said plurality of hemispherical indentations as long as the torque applied to said driving element is less than the individual bias of said movable elements;

(g) a trigger mechanism having a first part formed on said driving element that is rotated to an actuated position and is a flat segment formed normal to each radius passing through said bores formed in said driving element; and (h) a second part of said trigger mechanism secured to said driven element and communication with said first part and having a biased pin disposed along said radius passing through said bores, one end of which is in communication with said flat segments, said second part extending upon said first part moving to an actuated position.

* * * * *